United States Patent [19]

Orchard et al.

[11] 4,315,317
[45] Feb. 9, 1982

[54] PESTICIDE SPRAY MONITORING SYSTEM FOR SPRAY VEHICLES

[75] Inventors: Richard D. Orchard, Juneau, Ak.; Kurt L. Barbee, Lafayette, Colo.; Bradford S. Whiting, Corvallis, Oreg.; William C. Heussy, deceased, late of Shedd, Oreg.; by Loyal L. Pavenstedt, executrix, Portland, Oreg.

[73] Assignee: The United States of America as represented by the Secretary of Agriculture, Washington, D.C.

[21] Appl. No.: 100,081

[22] Filed: Dec. 4, 1979

[51] Int. Cl.³ .......................................... B05B 12/00
[52] U.S. Cl. .................................... 364/510; 239/71; 239/171
[58] Field of Search ............... 364/510, 420, 479, 509; 235/92 FL; 239/68, 71, 74, 171, 155, 156; 222/23, 30, 52

[56] References Cited

U.S. PATENT DOCUMENTS

| | | | |
|---|---|---|---|
| 3,877,645 | 4/1975 | Oligschlaeger | 239/155 |
| 3,977,605 | 8/1976 | Sheldon | 239/74 |
| 4,052,003 | 10/1977 | Steffen | 364/510 |
| 4,055,303 | 10/1977 | Brown | 239/171 |
| 4,072,934 | 2/1978 | Hiller et al. | 364/510 |
| 4,209,131 | 6/1980 | Barash et al. | 239/69 |
| 4,221,127 | 9/1980 | McClure | 364/510 |

Primary Examiner—Jerry Smith
Assistant Examiner—Gary Chin
Attorney, Agent, or Firm—M. Howard Silverstein; David G. McConnell

[57] ABSTRACT

A measuring, computing and recording system for real-time monitoring of spray application parameters for pesticides and the like, dispensed from aircraft. The system includes means for measuring, computing and recording (1) total liquid volume, (2) liquid pressure, (3) liquid flow rate, (4) total spray passes, and (5) total spray time. The system also includes means for measuring and recording relative humidity, air temperature, and dispensed liquid temperature. A spray pressure exceeding a predetermined pressure set point is required to initiate and maintain the flow rate computing and associated recording operations of the system. The measuring and recording of relative humidity, air temperature and dispensed liquid temperature may be independently controlled if so desired.

18 Claims, 7 Drawing Figures

PESTICIDE SPRAY MONITORING SYSTEM FOR SPRAY VEHICLES

FIELD OF THE INVENTION

This invention relates to spray monitoring systems, and more particularly to a system for spray process monitoring aboard aircraft or other spray vehicles for monitoring the spray application of liquid herbicides, insecticides, fertilizers, and other biological agents.

BACKGROUND OF THE INVENTION

When dispensing pesticides and other biological-treatment agents from aircraft, physical factors, such as aircraft speed, spraying height, spray pressure, flow rate, and swath width are all major factors affecting the degree of target coverage and dosage for a given formulation, concentration and nozzle size. The coverage, dosage, and pesticide stability determine the degree of mortality; therefore it is desirable to monitor and control the above factors.

Pesticide applicators calibrate the flow rate from their spray systems based on the following factors: (1) application rate (volume/unit area), (2) swath width, and (3) spray speed. The applicator assumes that these parameters remain constant throughout the spray job, when in fact they do not. When the spray pressure varies, the flow rate and degree of atomization also vary, which in turn alters the application rate.

Among important factors in particular to be monitored are spray pressure and liquid flow rate, since these provide information as to whether the spray nozzles are working properly. Also it is important for the pilot to monitor in real time the other spray parameters, such as total liquid volume dispensed, total spray passes, total spray time, ambient relative humidity, air temperature, and dispensed liquid temperature.

In the prior practice it was almost impossible for a pilot to observe all the above required factors and still perform accurate spray application within the very small time span of the application.

Therefore there is a need for improved equipment for monitoring spray application parameters so as to improve the ability to compare pesticide efficacies, determine the efficiency of performance of the spray equipment, and generally to alleviate pilot stress.

Previously employed systems have included a flow metering device which records the total liquid volume on an electro-mechanical counter and gives instantaneous flow rate on a meter. In the prior systems no permanent recording of the flow rate versus time is available, nor do these prior systems have provision for recording liquid pressure and spray passes, or for spray time data gathering.

A preliminary search of the patented prior art revealed the following prior U.S. Pat. Nos. of interest:
Ripper: 2,941,753
Cornett: 3,476,337
Johnson: 3,484,062
Zimmerman et al: 3,839,911
Zimmerman et al: 3,802,261
White et al: 3,934,471
Honey: 3,965,341

SUMMARY OF THE INVENTION

The present invention distinguishes over previously employed systems in that it records certain important parameters and thereby indicates when and how much variation has occurred. It also counts the number of times the spray system is turned on, and with the aid of two electromechanical event counters, totalizes the elapsed spray time and the volume sprayed. A check on the counter's data can be made using the flow rate recorder strip chart. In addition, an auxiliary unit is used to measure and record the liquid temperature at the pump housing or spray boom.

From the recordings taken during the application on a given plot of a pesticide or insecticide, coefficients of variation can be calculated from the spray times for each swath. Given the constant system pressure and flow rate during each swath, one can determine the variation in application rate due to pilot influence on air speed and start/stop judgments.

The system of the present invention provides real-time correlation of flow rate and liquid pressure, and thus provides the user with a diagnostic tool for troubleshooting the spray process. For example, (1) if the recordings show that the boom pressure is constant or slightly rising, and the corresponding flow rate is decreasing, then a restriction in flow is occurring at the nozzle tip or nozzle strainer; (2) if the recordings show the flow decreasing and the boom pressure decreasing, then a restriction has occurred somewhere between the pump and the boom, assuming pump performance to be constant. Other observed relationships between the recordings will also serve to provide data for diagnosing various other specific types of system malfunctions.

Accordingly, a main object of the invention is to provide an improved spray process monitoring system for use aboard aircraft or other spray vehicles, said monitoring system overcoming the deficiencies and disadvantages of the monitoring equipment previously employed.

A further object of the invention is to provide a novel and improved spray parameter-monitoring system suitable for use aboard aircraft or other spray vehicles employed for the spraying of liquid herbicides, insecticides, fertilizers, and biological agents, whereby to enable the vehicle operator to obtain real-time observation of the spray parameters and to determine if the spray nozzles or other parts of the system are operating properly.

A still further object of the invention is to provide a novel and improved monitoring system for use on a spray vehicle for monitoring important spray parameters, such as spray pressure, flow rate, total flow, elapsed spray time and total spray passes, as well as other concurrent parameters, such as ambient air temperature, relative humidity, and spray liquid temperature, and to obtain a permanent record of the most important parameters, which can be read without requiring any auxiliary equipment.

A still further object of the invention is to provide an improved parameter-monitoring system for aircraft or other spray vehicles, wherein the equipment is relatively compact in size, is light in weight, is low in power consumption, wherein the electromagnetic interference generated is minimized, and wherein the components may be readily fabricated in modular form.

BRIEF DESCRIPTION OF THE DRAWINGS

Further objects and advantages of the invention will become apparent from the following description and claims, and from the accompanying drawings, wherein:

DESCRIPTION OF A PREFERRED EMBODIMENT

Figure 1:
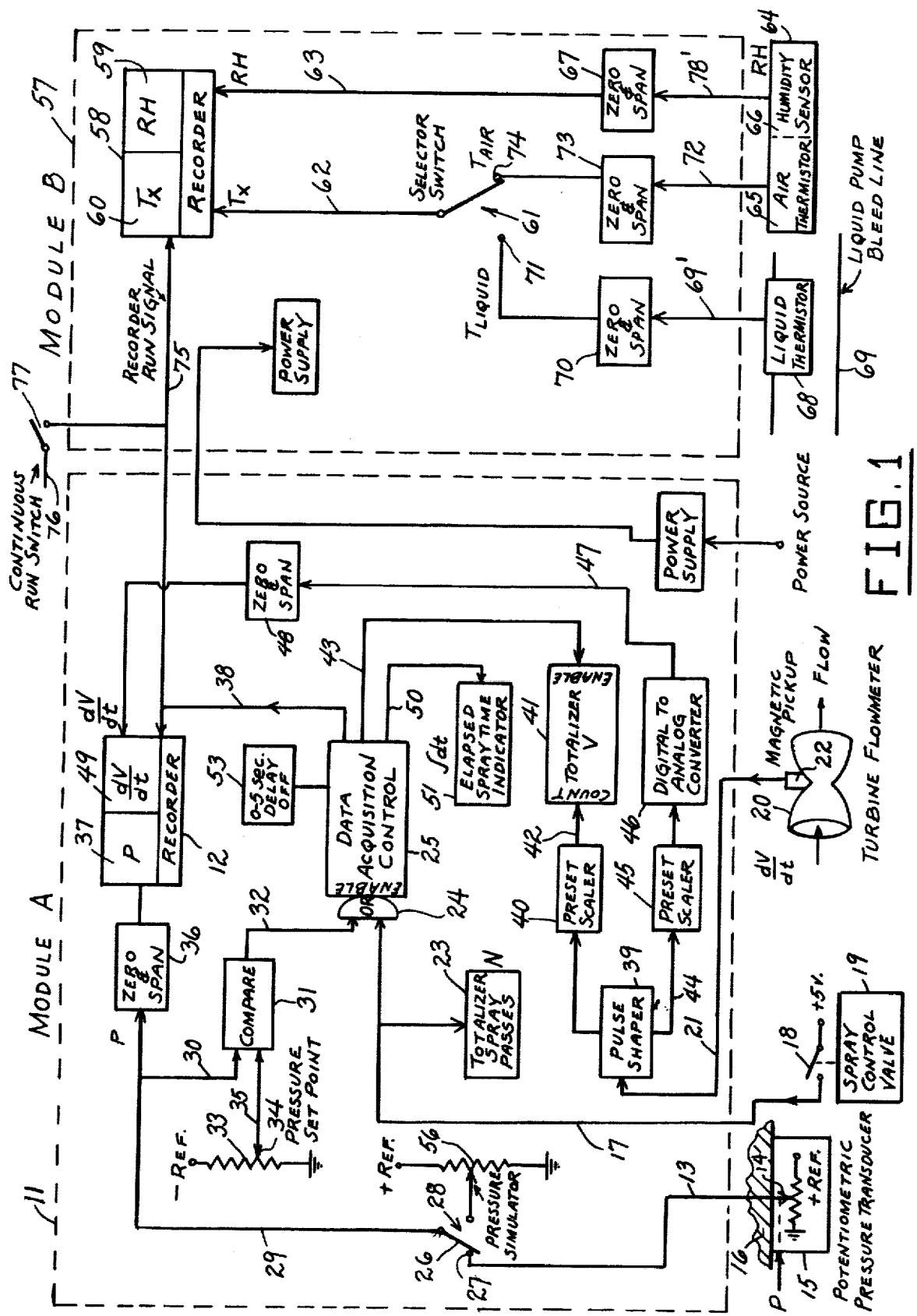
FIG. 1 is a block diagram of a spray parameter-monitoring system constructed in accordance with the present invention.

Referring to the drawings, FIG. 1 illustrates in block form a typical aircraft spray monitoring system according to the present invention. The system may comprise two separate modular units, shown as "Module A" and "Module B".

The basic unit, Module A, records:
1. Spray pressure, (P),
2. Flow rate, (dV/dt),
3. Total flow, (V),
4. Elapsed spray time, (sum dt),
5. Total spray passes, (N).

Figure 4:
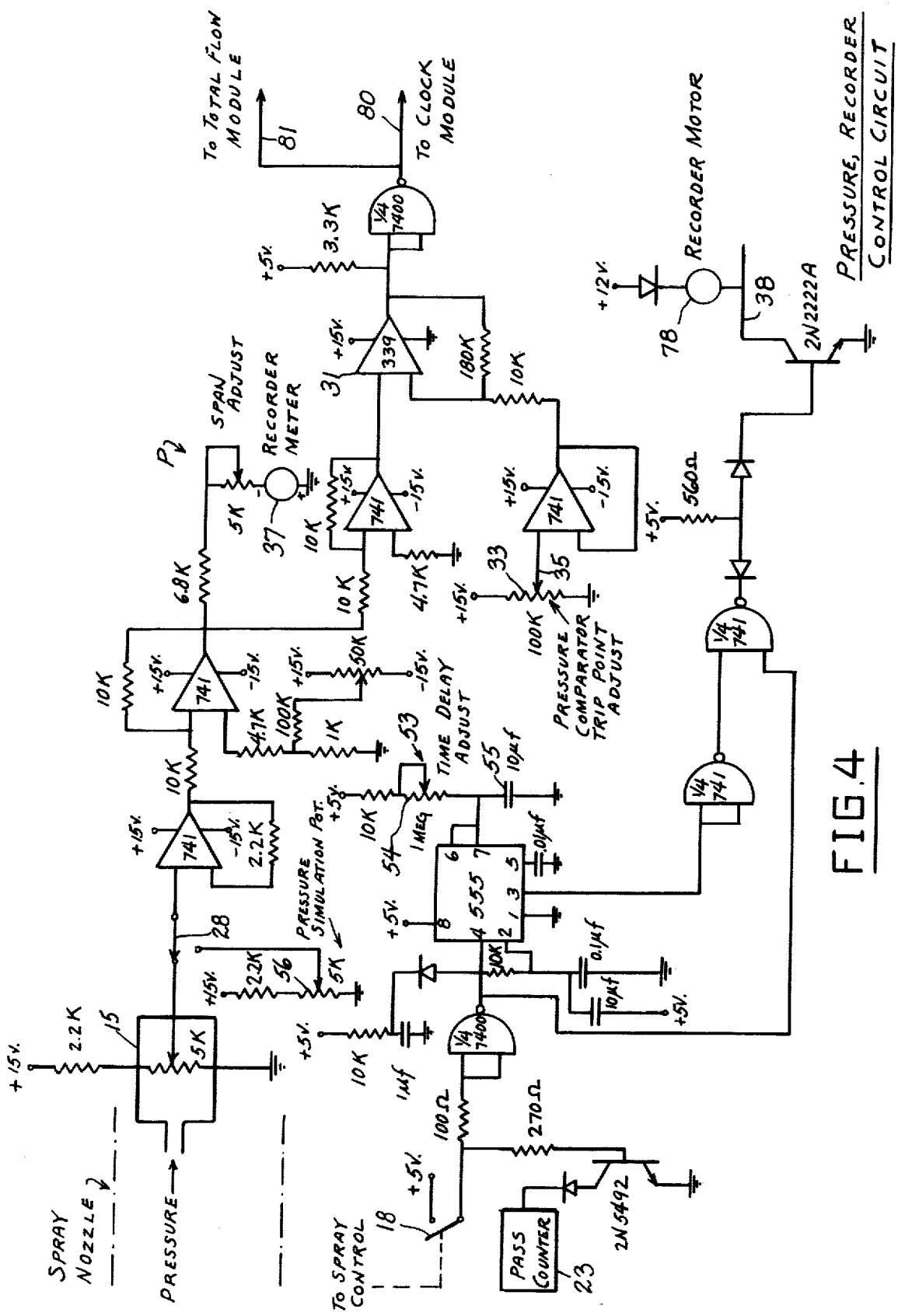
FIG. 4 is a wiring diagram of the spray pressure recording, spray pass counting, and recorder motor control portions of a system such as that shown in FIG. 1.

Module A comprises a metal box 11 housing the electronic components, the digital counters, and a dual strip-chart recorder 12 having respective recorder meters 37 and 49 and a comon strip moving motor 78 (FIG. 4). A pressure signal input line 13 is connected to the slider contact 14 of a conventional potentiometric pressure transducer suitably mounted on the spray boom 16 in a position subjected to the pressure of the spray fluid, said transducer being shown at 15. A spray on-off sensing line 17 leads to a spray on-off signal switch 18 closed responsive to activation of the conventional spray control valve device 19. A conventional flow transducer, such as a turbine flowmeter 20, is connected between the discharge end of the associated spray pump, not shown, and the spray nozzle, providing a flow rate signal dV/dt in the line 21 connected to the output of the magnetic pickup 22 of the turbine flowmeter 20.

Each time a spray pass is to be initiated, the pilot activates the spray control valve device 19, which closes switch 18 and provides a control signal in line 17. This control signal is furnished to a spray pass totalizer 23 which thereby advances one count. Said control signal is also furnished to one input terminal of an OR enabling gate 24 connected to the input of a data acquisition unit 25.

The pressure transducer line 13 is connected via the pole 26 and stationary contact 27 of a 2-position selector switch 28, and via a line 29 and a line 30 to one input terminal of a comparator 31 which provides a second control signal at its output line 32 when the boom pressure signal in line 29 rises above a set point, for example, corresponding to a pressure of 15 psig, (or 1.1 kg/cm$^2$), established by a an adjustable set point potentiometer 33. This set point is established by suitably adjusting the sliding contact 34 of the potentiometer 33, which is connected by a line 35 to the remaining input terminal of comparator 31.

Since most spray systems use diaphragm check valves at their nozzles to prevent dripping, the compared dual control signals in lines 30, 35 assure that the monitoring equipment will not operate without flow through the dispensing nozzles.

The pressure signal line 29 is connected via a conventional zero and span-adjusting circuit 36 to the pressure meter section 37 (see FIG. 4) of the recorder 12. A recorder "run" signal to the recorder motor 78 of recorder 12 is provided in an output line 38 of the data acquisition control unit 25 in response to the presence of either of the two respective control signals in the lines 17 (closure of switch 18) and 32 (output of comparator 31).

The flow rate signal in line 21 is furnished to a pulse shaper circuit 39. One output of unit 39 is supplied via a conventional preset scaler 40 to a counter (flow totalizer) 41 via a line 42. The counter 41 is enabled by an output signal from data acquisition control unit 25 via a line 43.

A second output signal from pulse shaper 39 is furnished via a line 44 and a preset scaler 45 to a conventional digital-to-analog converter 46. The analog output signal from converter 46 is furnished via a line 47 and a conventional zero-and-span adjusting circuit 48 to the flow rate (dV/dt) meter 49 (see FIG. 5) of the recorder 12. Thus, the presence of the two control signals in lines 29 and 21 (pressure and flow rate) causes the recorder 12 to function so as to record spray boom pressure (P) and flow rate (dV/dt). In addition, a third output line 50 carries clocked time pulses to a summing unit 51 which thereby gives the elapsed spray time indication as a display.

Thus, as above pointed out, when data acquisition unit 25 is enabled, either by a comparator output signal in line 32, or by the closure of spray valve-controlled switch 18, the presence of the two respective signals (pressure and flow rate) in the lines 29 and 21 not only causes the recorder to function and record spray boom pressure (P) and flow rate (dV/dt) but the closure of switch 18 also causes the total spray passes totalizer 23 to advance an increment to an updated value of (N), the elapsed time (sum dt) indicator 51 to run, and the total flow (V) totalizer 41 to count.

Figure 5:
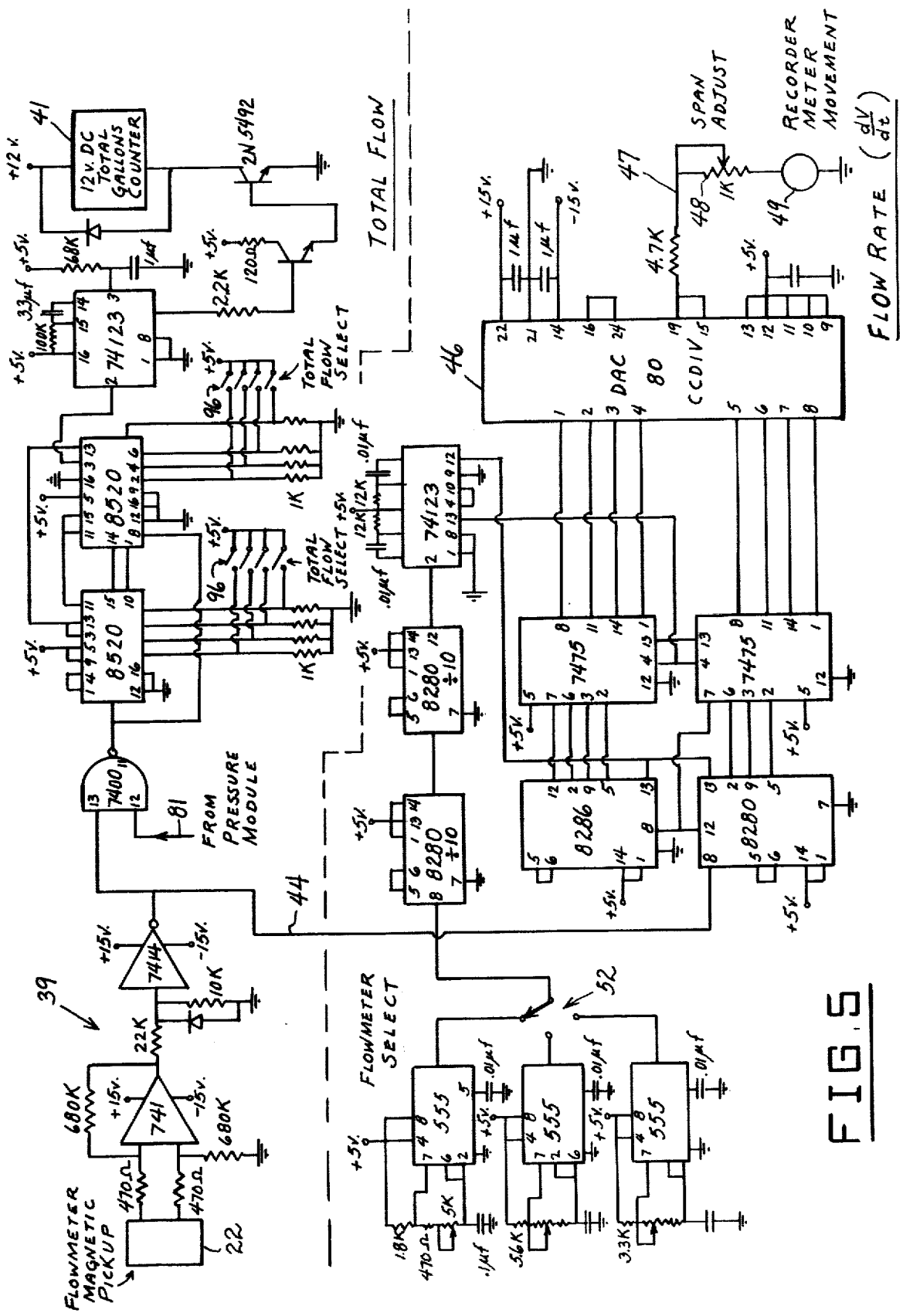
FIG. 5 is a wiring diagram of the total flow computing and flow rate recording portions of a system such as that shown in FIG. 1.

Boom pressure to voltage conversion is accomplished by means of the potentiometric transducer 15, while volumetric flow to pulse rate information is generated by the rotation of a magnetic turbine impeller in the conventional turbine flowmeter 20. Further signal processing by means of the pulse shaper 39 is required prior to counting the number of pulses (in totalizer 41) or generating an analog signal proportional to the pulse rate (in converter 46). The number of pulses is scaled in preset scaler 40 to indicate total flow V, which is registered in the resettable digital counter 41. The digital-to-analog converter 46 provides a flow rate signal (dV/dt) in voltage form and is recorded in the channel containing the recorder meter 49 of dual channel recorder 12; its range is adjusted by the preset scaler 45. Since the flow rate (dV/dt) varies with liquid viscosity and density, a choice of one of three flow meters can be made. Each of the flow meters can be precalibrated for a range of liquid viscosity and/or density. FIG. 5 shows a 3-position selector switch 52 employed for selecting a suitable one of three available flowmeter precalibration circuits in accordance with the viscosity and density of the fluid dispensed, and the total flow computing circuit is provided with corresponding flow meter compensation switches 96 which are closed in predetermined closure arrays in accordance with the selected flowmeter calibration circuit.

On spray systems where large-diameter booms are used with low flow rates, a few seconds are required for spraying to cease once the spray valve 19 has been turned off. Operation of recorder 12 will continue as long as the boom pressure signal (P) in line 29 is large enough to provide the required comparator output in line 32. The time required for the boom pressure (P) to return to a static condition will vary, depending on volume in the boom, flow rate, and operating pressure. In order to account for the spray emitted during this time interval, a time delay circuit device 53 is connected to the recorder control circuit, arranged to allow data to be collected for an interval adjustable between zero and up to 10 seconds (see FIG. 4, wherein an adjustable potentiometer in circuit with a delay capacitor are employed, shown respectively at 54 and 55, to delay deenergization of the recorder motor 78). A pressure simulator potentiometer 56 provides an adjustable test signal, via switch 28, allowing the system to be tested without spray control valve activation, or without a pressure signal.

Referring in FIG. 1 to Module B, this module records air or liquid temperature ($T_{air}$ or $T_{liquid}$) and relative humidity (RH). The electronic components of said module are enclosed in a metal housing 57 and include a dual stripchart recorder 58 which records the relative humidity (RH) in one channel having a meter 59, and which has another channel with a meter 60 which, by means of a 2-position selector switch 61 may be used to provide a recording ($T_x$) of either the air temperature ($T_{air}$) or liquid temperature ($T_{liquid}$). The $T_x$ signal is furnished via switch 61 and line 62 to the recorder meter 60, and the RH signal is furnished to the recorder meter 59 via a line 63.

A conventional relative humidity computing circuit 64, including an ambient air temperature-sensing thermistor 65 and an ambient humidity sensor 66, provides a linear voltage output to line 63 proportional to relative humidity through a line 78' and a zero-setting and span-adjusting circuit 67. A liquid temperature-sensing thermistor 68, installed in the liquid pump bleed line 69 in the pump housing, or at any port on the spray boom, senses fluid temperature ($T_{liquid}$). The $T_{air}$ and RH sensors 65 and 66 may be housed in a small metal box which is attached to the aircraft exterior at any point where the spray from the boom or heat from the engine does not influence the sensor readings.

The liquid thermistor signal ($T_{liquid}$) is furnished via a line 69' and a zero-setting and span-adjusting circuit 70 to one stationary contact 71 of switch 61. The air thermistor signal ($T_{air}$) is furnished via a line 72 and zero-setting and span-adjusting circuit 73 to the other stationary circuit 74 of switch 61.

The chart driving motor of recorder 58 may be operated from the same line 38 of recorder 12 via a line 75, or may be run continuously from a separate energizing line 76 via a manually controlled switch 77. Switch 77 may be used to override the recorder run signal from line 38. This interface allows Module B to be used either independently or concurrently with Module A, whichever is desired.

Where microbial pesticides are being used, it is important to establish the temperature effect on microbial activity. It is conceivable that inactivation of the microbe due to heat build-up might occur with continuous rigorous recirculation during long ferrying distances with small payloads and low flow rates. The greatest temperature should occur at the pump housing, since this is where the greatest shear occurs. The thermistor 68 for measuring ($T_{liquid}$) is preferably housed in a ⅛ inch pipe-threaded nipple. This nipple can be threaded into the pump housing bleed line 69.

Figure 6:
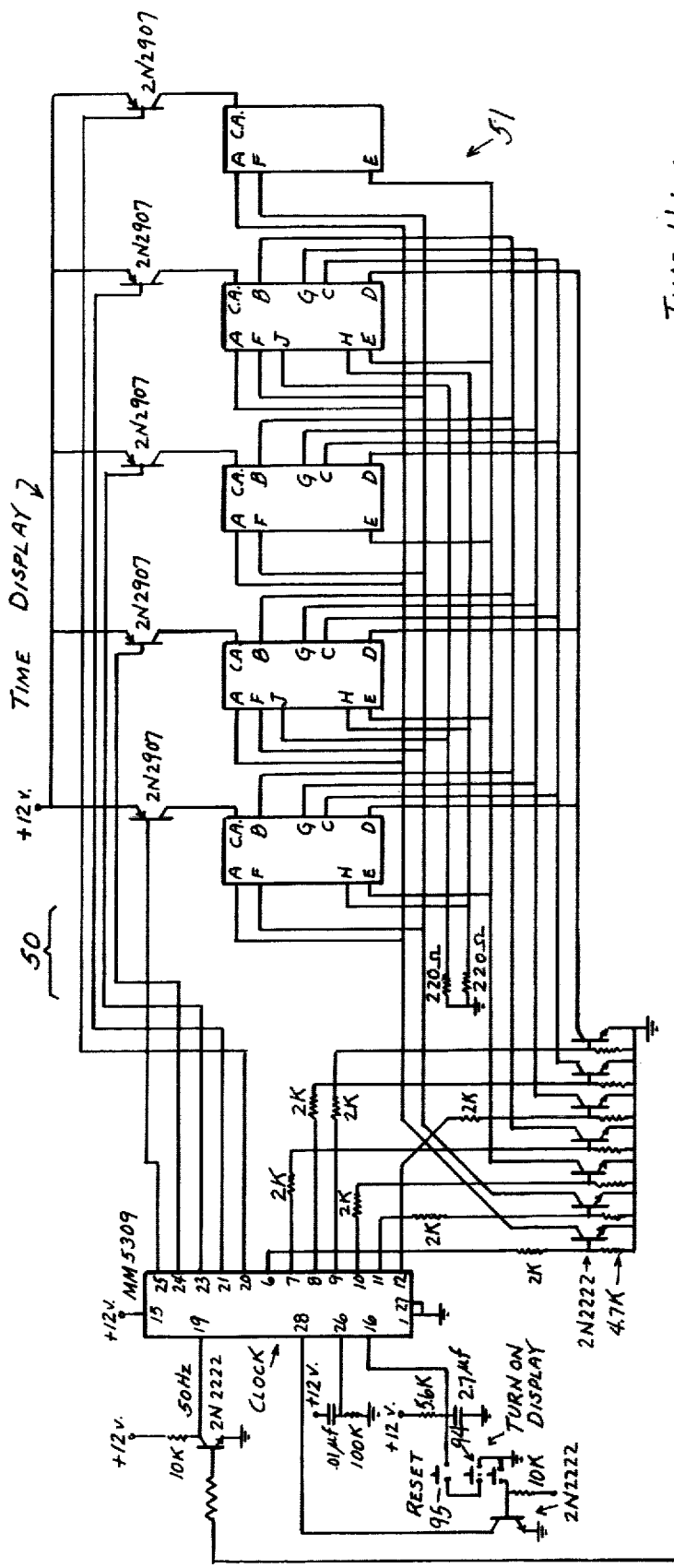
FIG. 6 is a wiring diagram of the timing unit portion of a system such as that shown in FIG. 1.
Figure 6:
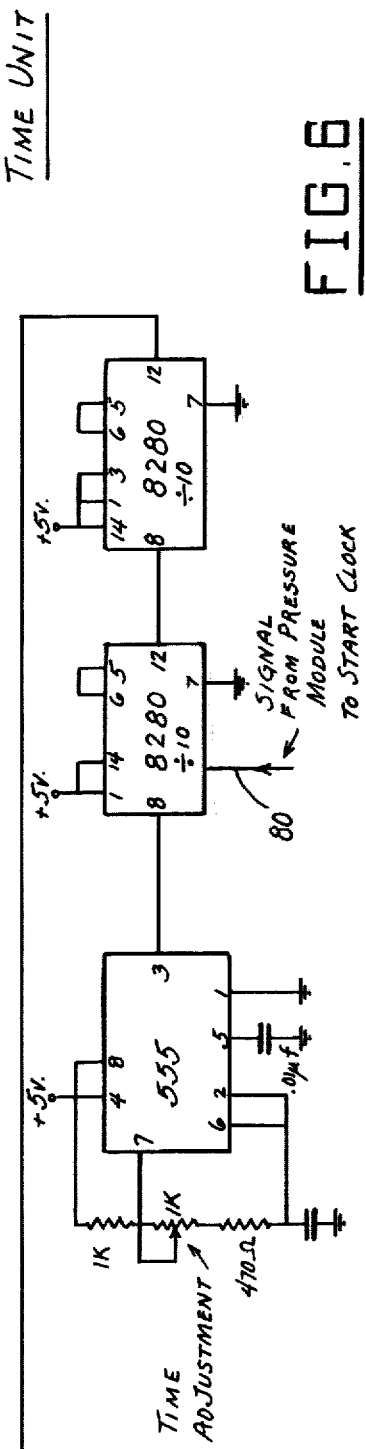
Figure 7:
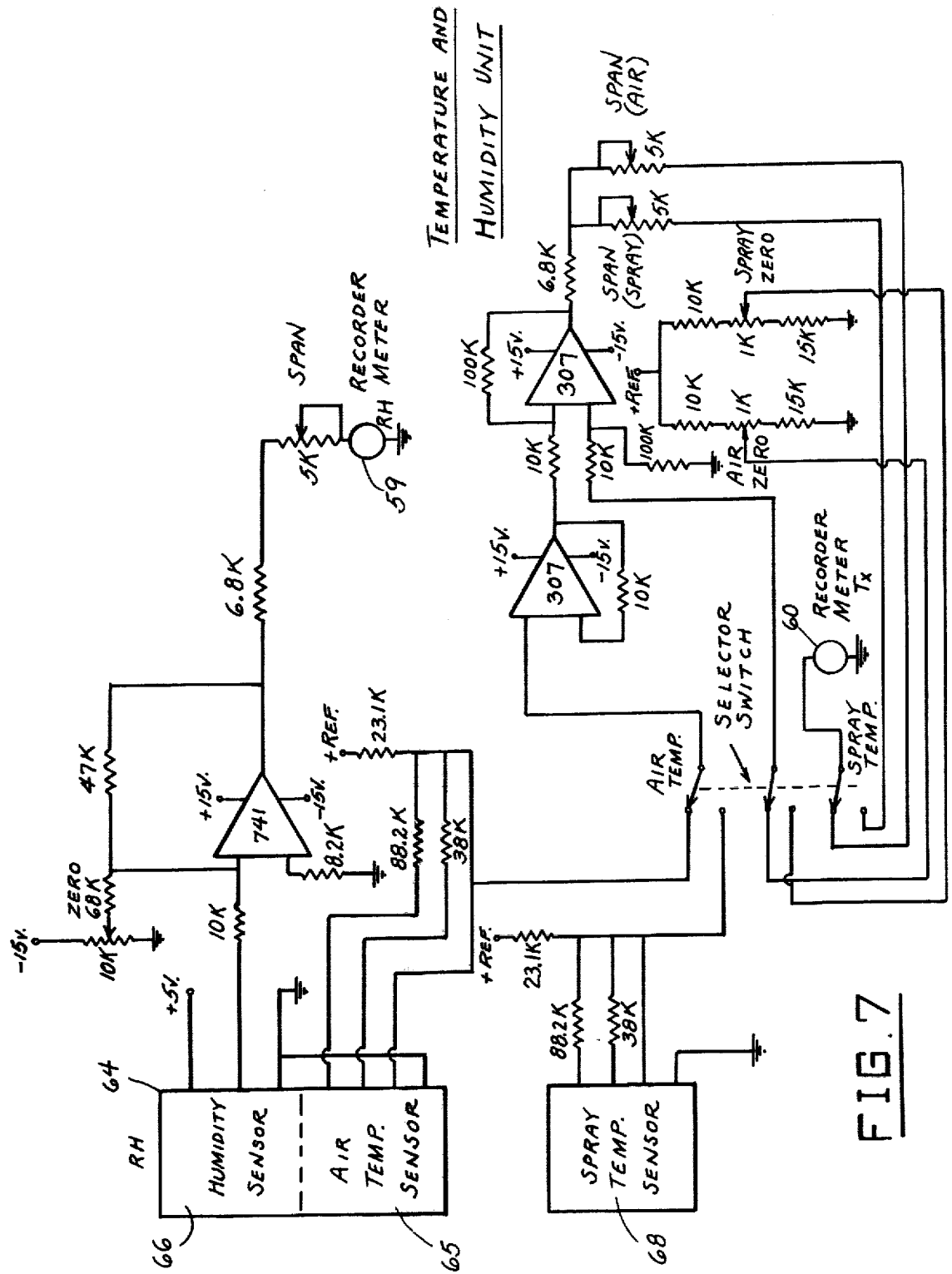
FIG. 7 is a wiring diagram of the temperature and humidity recording portion of a system such as that shown in FIG. 1.

FIGS. 4, 5, 6 and 7 are wiring diagrams of typical respective specific portions of the system broadly disclosed and illustrated in FIG. 1, namely, the pressure recording circuit, including the pass counter (FIG. 4), the total flow indicating and flow rate recording circuits (FIG. 5), the elapsed spray time indicating circuit (FIG. 6) and the Module B, namely, the temperature and humidity monitoring circuit (FIG. 7).

FIG. 4 shows specific circuit components, with circuit values, which can be employed for recording the spray pressure sensed by the pressure transducer 15, and for transmitting the pressure data to the meter portion 37 of recorder 12. It also includes the circuitry associated with the pass counter 23 and the recorder drive motor 78, as well as the pressure simulation potentiometer 56 employed for test purposes, and the pressure comparator trip point adjusting potentiomter 33. A derived pressure signal, furnished respectively to the total flow monitor portion of the system (FIG. 5) and the elapsed time counting portion of the system (FIG. 6) is provided respectively at output wires 81 and 80 of FIG. 4.

FIG. 5 shows specific circuit components, with most circuit values, which can be typically employed for monitoring the total flow, displayed at the counter or totalizer 41, and for converting the digital flow rate information into analog form (by means of digital-/analog converter 46) and applying the analog flow rate to the meter portion 49 of the recorder 12. The pressure signal at wire 81 is employed to enable the subsequent counting of the flow units by the totalizer 41.

FIG. 6 shows specific clock and time display circuitry which can be typically employed to compute and display elapsed spray time (sum dt), namely, to display the elapsed time during which the pressure signal of wire 80 is applied thereto. A threshold pressure, determined by the setting of the potentiometer 33, starts and stops the spray time clock 51 and the total flow counter 41. Spray time is accumulated when the spray pressure is greater than the spray pressure reference defined by the setting of potentiometer 33. To read the spray time, a display switch 94 is actuated. To reset the spray time clock, a reset switch 95 and the time display switch 94 are simultaneously actuated.

FIG. 7 shows specific circuitry which may be employed for Module B, namely, the temperature and humidity monitoring portion of the system. In this specific circuitry, a three-pole, 2-position selector switch is employed instead of the single-pole switch 61 of FIG. 1, so as to provide suitable switching of the meter zeroing potentiometers and span-adjusting potentiometers, along with the switching of the air temperature and spray temperature sensors 65 and 68.

The various circuit components shown in the wiring diagrams of FIGS. 4 to 7 are all commercially available.

Figure 2:
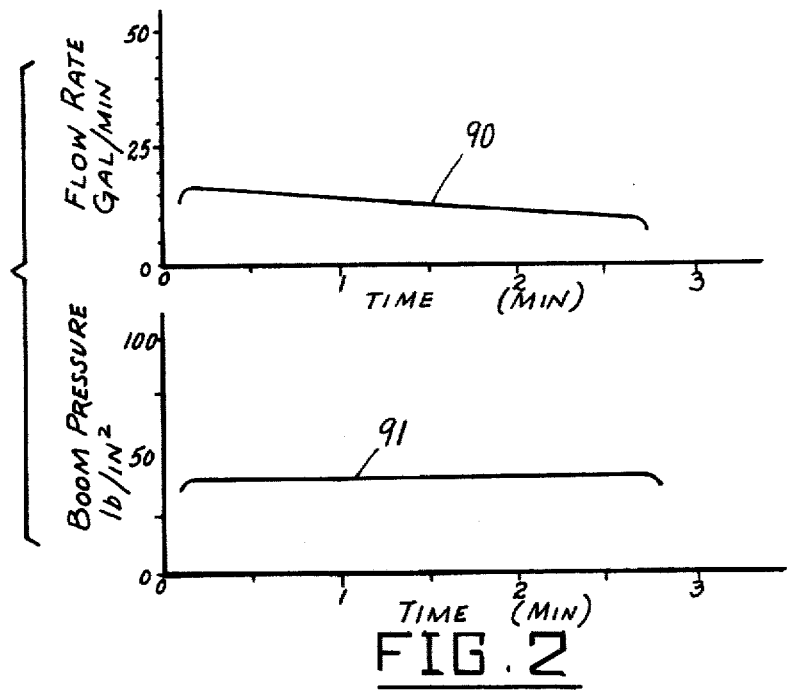
FIG. 2 shows associated recorded flow rate and boom pressure curves obtained when there is a restriction in flow at the nozzle tip or nozzle strainer of the associated spray system.
Figure 3:
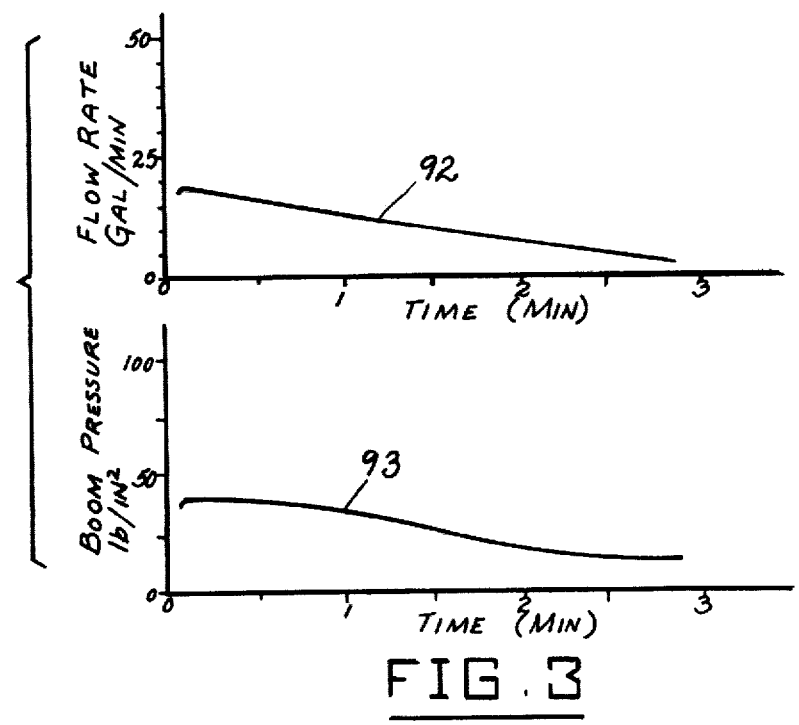
FIG. 3 shows associated recorded flow rate and boom pressure curves obtained when there is a restriction at a location between the pump and the boom of the associated spray system.

As was previously mentioned, the system provides real-time correlation of flow rate and liquid pressure and thus can be used as a diagnostic tool for troubleshooting the spray process. For example, FIG. 2 shows a recorded flow rate curve 90 which is decreasing with time while the corresponding recorded boom pressure curve 91 is slightly rising over the same time period. This indicates that a restriction in flow is occurring at the nozzle tip or nozzle strainer. Another example of malfunction is illustrated in FIG. 3 wherein the recorded flow rate curve 92 shows a marked decrease with time while the boom pressure recording 93 likewise shows a pressure decrease over the same time period. This indicates that a restriction has occurred somewhere between the pump and the boom, assuming that the pump performance has remained constant. Various other system malfunctions can be diagnosed from the observed relationships between the recordings.

In an alternative embodiment of the system of the present invention, a conduit circuit arrangement may be employed providing constant circulation of the liquid to the spray boom, with the excess returned to the reservoir. A matched pair of flow meters, one in the supply conduit and the other in the return conduit may be employed, so as to obtain a difference signal which would correspond to the net flow through the nozzles. By converting the two pulse rates to voltages and measuring the voltage difference, an analog flow rate signal would be produced. With an appropriate clocked, gated, and buffered digital counter, the total net flow through the nozzles could also be obtained.

While a specific embodiment of a vehicular spray monitoring system has been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiment.

What is claimed is:

1. A spray monitoring system for a vehicle comprising spray control means, spray pressure electrical sensing means in the spray flow path generating an electrical spray pressure signal corresponding to the sensed spray pressure responsive to emission of spray fluid from the vehicle, recorder means including a pressure indicator and means to record the display of the pressure indicator, circuit means connecting said sensing means to the pressure indicator, threshold pressure means to establish a pressure threshold electrical signal, means to compare the sensed electrical spray pressure signal with said threshold signal, circuit means to enable said recorder means responsive to activation of said control means, and means to enable said recorder means to continuously record the display of the spray pressure indicator while said sensed pressure signal is greater than said pressure threshold signal.

2. The spray monitoring system of claim 1, and wherein said threshold pressure means is adjustable so as to vary the magnitude of said pressure threshold signal.

3. The spray monitoring system of claim 1, and wherein said circuit means to enable the recorder means includes an OR gate, and circuit means connecting the output of said OR gate to said recorder means, and wherein said comparison means includes a comparator, circuit means connecting said pressure threshold signal to one input terminal of the comparator, circuit means connecting said sensed spray pressure-generated signal to the other input terminal of said comparator, and circuit means connecting the output of the comparator to an input terminal of said OR gate.

4. The spray monitoring system of claim 3, and wherein said first-named circuit means to enable said recorder means includes circuit means to apply another signal to another input terminal of said OR gate responsive to activation of said spray control means.

5. The spray monitoring system of claim 1, and further including spray pass counter means, and circuit means to activate said spray pass counter means each time that the spray control means is activated.

6. The spray monitoring system of claim 1, and wherein said recorder means includes a flow rate indicator, and wherein said system includes electrical flow rate sensing means arranged to sense the volumetric rate of spray emission, flow rate circuit means connecting said flow rate sensing means to said flow rate indicator, and means to continuously record the sensed indicated flow rate along with the display of the pressure indicator.

7. The spray monitoring system of claim 6, and further including flow totalizer means, and totalizer circuit means connecting said flow rate sensing means to said flow totalizer means.

8. The spray monitoring system of claim 6, and wherein said flow rate circuit means includes a digital-to-analog converter.

9. The spray monitoring system of claim 6, and wherein said pressure indicator, said flow rate indicator and said recorder means comprise a dual-channel recorder having a common recorder drive motor.

10. The spray monitoring system of claim 6, and further including flow totalizer means, totalizer circuit means connecting said flow rate sensing means to said flow totalizer means, and means to maintain said recorder means in operation for a predetermined time delay period after deactivation of said spray control means.

11. The spray monitoring system of claim 6, and further including means to maintain said recorder means in operation for a predetermined time delay period after deactivation of said spray control means.

12. The spray monitoring system of claim 11, and further including potentiometer means to adjust said predetermined time delay period.

13. The spray monitoring system of claim 1, and further including elapsed time display means, and means to activate said elapsed time display means when said sensed spray pressure-generated signal is greater than said pressure threshold signal.

14. The spray monitoring system of claim 1, and further including means for concurrently measuring and recording the relative humidity adjacent to the associated vehicle.

15. The spray monitoring system of claim 1, and further including means for concurrently measuring and recording the air temperature adjacent to the associated vehicle.

16. The spray monitoring system of claim 1, and further including means for concurrently measuring and recording the dispensed fluid temperature.

17. The spray monitoring system of claim 1, and further including electrical means to generate a simulated electrical pressure signal, and circuit means to at times substitute said simulated electrical pressure signal for said spray pressure-generated electrical signal.

18. A spray monitoring system for a vehicle comprising spray control means, spray pressure electrical sensing means in the spray flow path generating an electrical spray pressure signal corresponding to the sensed spray pressure responsive to emission of spray fluid from the vehicle, recorder means including a pressure indicator and means to record the display of the pressure indicator, circuit means connecting said sensing means to the pressure indicator, circuit means to enable said recorder means responsive to activation of said control means, and means to enable said recorder means to continuously record the display of the spray pressure indicator while said sensed pressure signal is greater than a predetermined value.

* * * * *